July 18, 1967

F. GOETZ ETAL 3,331,600

SOLID INTEGRAL ELASTIC BODY OF RUBBER-ELASTIC MATERIAL
FOR STRESSING BY COMPRESSIVE FORCES AND TENSILE
FORCES, PARTICULARLY FOR CUSHIONING WHEEL
AXLES OF VEHICLES

Filed June 29, 1965

INVENTORS
Friedrich GOETZ
Wilhelm HERMEIER
Herbert MERZ

Lowry & Rinehart
Attys

INVENTORS
Friedrich GOETZ
Wilhelm HERMEIER
Herbert MERZ

United States Patent Office 3,331,600
Patented July 18, 1967

3,331,600
SOLID INTEGRAL ELASTIC BODY OF RUBBER-ELASTIC MATERIAL FOR STRESSING BY COMPRESSIVE FORCES AND TENSILE FORCES, PARTICULARLY FOR CUSHIONING WHEEL AXLES OF VEHICLES
Friedrich Goetz, 44 Am Schiffgraben, Hannover, Germany; Wilhelm Hermeier, 242 Wegholm, Friedewalde via Minden, Germany; and Herbert Merz, 101 Misburger Muhlenweg, Hannover-Buchholz, Germany
Filed June 29, 1965, Ser. No. 468,014
6 Claims. (Cl. 267—63)

This invention relates to solid integral elastic bodies of rubber-elastic material such as natural or synthetic rubber or plastics, which are particularly intended for cushioning wheel axles of vehicles but may also be used for other cushioning purposes preferably in such cases where the elastic bodies are exposed to stress by compressive forces and tensile forces smaller in relation to the compressive forces.

An elastic body has already become known which in unloaded state is in height larger than in width and has an H-shaped basic form defined by a pair of flanges which have the full height of the elastic body and are interconnected by a central portion. Elastic bodies of this type have excellent properties. They ensure large travel strokes with a markedly progressive spring characteristic, they are temporarily overloadable to a very high degree and insensitive to mechanical damage and, furthermore, they require only small space and are relatively simple and inexpensive to manufacture. However, they prove good in practice only on the condition that they are always subject to a certain compressive stress. If, during the stressing in operation, the elastic bodies are fully unloaded or the bearing members for the elastic bodies are moved apart even beyond the unloading point, the elastic bodies may drop out of the bearing members and this may lead to damage to the bearing members or the parts to be cushioned.

When cushioning vehicle wheels by means of the above-described known elastic bodies it has been endeavoured to overcome this shortcoming by providing a metallic safety device which is separate from the elastic body and limits the maximum distance between the bearing members by a stop member and by means of which the elastic body is slightly prestressed. This prestressing must be sufficiently large for the event a lasting full loading or overloading should be followed by a sudden full unloading, because the designed height of the unloaded elastic body is regained only after a certain time has elapsed. If, however, considering this effect, the prestressing is chosen to be sufficiently large, then the disadvantage has to be put up with that the first section of the highly progressive spring characteristic, which has a particularly flat course, cannot be utilized for the cushioning action. This is a serious disadvantage for spring suspensions of vehicle wheels, above all in case the vehicle is empty, since then the vehicle wheels may lose their contact with the roadway.

It is the object of the present invention to eliminate the disadvantages and deficiencies of the known H-shaped elastic bodies.

This object is achieved according to the invention by providing a solid integral elastic body of rubber-elastic material for stressing by compressive forces and tensile forces smaller in relation to the compressive forces, particularly for cushioning wheel axles of vehicles, which comprises a pair of flanges having the full height of the elastic body, a central portion connecting said pair of flanges and defining, together with said pair of flanges, an H-shaped basic form of the elastic body, sections on said flanges in the vicinity of marginal edges thereof defining the height of the elastic body, said sections having a reduced resistance to deformation as compared with the main sections of the elastic body, and bearing members for the elastic body positively connected with the elastic body and supporting in the direction of the compressive forces all surface sections of the boundary surfaces of the elastic body facing the bearing members, said sections of reduced resistance to deformation being arranged between two parts of said bearing members connected with them.

This construction not only prevents dropping out of the elastic body in the event of full unloading but also ensures constant contact between the elastic body and the bearing members even if the bearing members move apart beyond the unloading point. Furthermore, it is possible to build in the elastic body without any prestressing and to utilize its characteristic to its full extent. At the same time the advantageous mode of operation is obtained that the transistion from the range of tensile force to the range of compressive force is entirely continuous and smooth. Moreover, the usually necessary safety device is dispensed with and this still further simplifies the construction of the entire spring arrangement.

The sections of the elastic body of reduced resistance to deformation, which are stressed by tension and transmit the tensile forces to the main sections of the elastic body, can have a cross section which amounts only to a fraction of the cross section of the main sections of the elastic body which are stressed by pressure. This ensures, on the one hand, that the effect aspired to is achieved with a minimum of rubber volume. On the other hand, the advantageous effect is obtained that the spring characteristics for the tensile stress and for the compressive stress of the elastic body differ from one another quite considerably. This property affords, e.g. for the cushioning of vehicle wheels, the essential advantage that a vehicle wheel cushioned by means of the elastic bodies as proposed by the invention maintains its contact both with the roadway and with the elastic body even when driving through deep road holes. Moreover, this renders possible the assemblage of spring sets of particularly great progressivity when an elastic body constructed in accordance with the invention is incorporated so as to be prestressed by tension against the action of a compression spring of any desired type.

The invention quite considerably enlarges the field of application of solid integral elastic bodies having an H-shaped basic form and provides the advantageous possibility of utilizing the favourable properties of such elastic bodies for a great number of fields of application in which the use of elastic bodies in the known form was not possible or only with essential reservations. An important instance of use to which these circumstances are applicable is the cushioning of vehicle wheels.

For the practical realization of the invention above all two forms of construction come into question. In the first form of construction the sections of reduced resistance to deformation are constructed as webs connecting the flanges and having no direct connection with the central portion. This solution is particularly advantageous because the same overall height can be retained as for an elastic body of known construction. Moreover, constructing the sections of reduced resistance to deformation as connecting webs between the flanges permits the use of particularly high flanges and accordingly, large travel strokes when subjecting the elastic body to pressure, because the connecting webs prevent the ends of the flanges from spreading apart under the pressure load. This enables to take up lateral forces.

The characteristic feature of the second form of construction consists in that the sections of reduced resistance to deformation are constructed as eye-like extensions on the ends of the pair of flanges and bolts which are mounted in parts of the bearing members exclusively serving to subject the elastic body to pressure are passed through said extensions. In this second form of construction the elastic body as proposed by the invention is suitable above all for such cases where the relative angular position of the bearing members for the elastic body substantially changes during the cushioning action, as e.g. when using a relatively short swing arm. The elastic body can adjust itself in the event of pressure load and tensile load according to the respective direction of loading. Furthermore, in this form of construction it is possible to adapt the smallest cross section stressed by tension to any requirement.

In both forms of construction it is possible and in many cases advantageous to arrange in the unloaded condition of the elastic body those parts of the bearing members by means of which the sections of reduced resistance to deformation are loadable in the direction of the tensile forces at such a free distance from pressure surfaces of the central portion that when subjecting the elastic body to pressure, they come into engagement with the pressure surfaces facing them, after a predetermined travel stroke of the elastic body. This ensures with very simple means a multistage stroke of the elastic body in the event of pressure load, which leads to a particularly marked progressivity of the spring characteristic.

As a further development of the invention, reinforcing ribs which are provided on the outer side of the flanges of the elastic body and extend in the longitudinal direction of the flanges may be so arranged that they terminate outside the region of the sections of reduced resistance to deformation. The invention finally proposes a special arrangement of elastic bodies which is characterized in that several elastic bodies constitute a spring assembly in such a manner that at least one of the elastic bodies while subjecting its sections of reduced resistance to deformation to tension is prestressed by tension contrary to prestressing by pressure of one or more of other elastic bodies, when the spring assembly is in unloaded condition. This provides the possibility of assembling spring sets having a particularly great progressivity. It is essential that the elastic body or bodies to be incorporated so as to be prestressed by tension should be constructed in accordance with the teaching of the present invention. Also the elastic bodies prestressed by pressure may be such ones as proposed by the present invention. However, as elastic bodies prestressed by pressure also compression springs of any desired type, e.g. also metal springs such as leaf or coil springs, may be used.

Several embodiments of the invention will now be described by way of example and with reference to the accompanying drawings, in which:

FIG. 2b is a schematic side elevational view of the elastic body of FIG. 2a turned through an angle of 90 degrees relative to FIG. 2a;

FIG. 4b is a schematic side elevational view, partly in section, of the elastic body of FIG. 4a turned through an angle of 90 degrees relative to FIG. 4a;

Figure 1A:
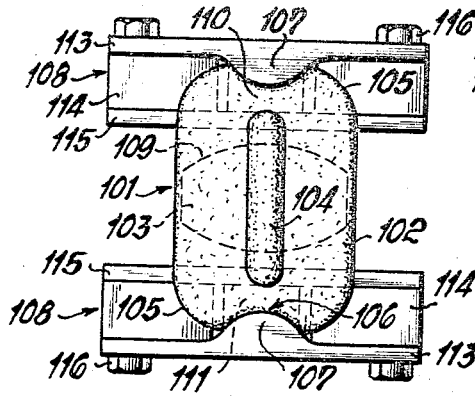
FIG. 1a is a schematic side elevational view, on an arbitrary scale, of an elastic body according to the invention with bearing members.

In all figures of the drawings three-figure reference numerals have been used, the first figure of the reference numerals always designating the figure or group of figures of the drawings. The same two last figures of the reference numerals designate the same or comparable parts in different embodiments.

Referring to the embodiment shown in FIGS. 1a, 1b, 1c, 1d and 1e, an elastic body 101 comprises two flanges 102 interconnected by a central portion 103. The flanges may have ribs 104 extending e.g. in the longitudinal direction thereof, which ribs prevent buckling above all in the case of large overall height. The flanges 102 preferably terminate in rounded marginal edges 105. Furthermore, for accurately guiding the elastic body, the flanges may advantageously be provided with recesses 106 which are engaged e.g. by semicircular sections 107 of bearing members 108 for the elastic body. Surfaces 109 of the central portion 103 facing the bearing members 108 may also preferably be of curved configuration in order to obtain a marked progressivity of the spring characteristic when subjecting the elastic body to pressure. The flanges 102 further have at their upper and lower marginal edge portions 110 a connecting web 111 which, in the exemplified embodiment shown in the drawing, is positioned on the longitudinal center axis of the elastic body. The connecting webs 111 form together wtih the central portion 103 windows 112. Each bearing member 108 comprises e.g. a base plate 113 to which the strip of semicircular section 107 is firmly connected. The base plate 113 further has guide pieces 114 secured thereon which engage in the space formed between the flanges 102. The spacing $a$ of the guide pieces 114 is slightly larger than the width $b$ of the connecting webs 111. The bearing members 108 further include plate-like retaining members 115 which are passed through the windows 112 and fastened to the guide pieces 114 e.g. by screws 116. In FIG. 1 such screws are indicated by dot-and-dash lines.

When tensile load is being applied to the elastic body e.g. by a depending axle of a vehicle or a vehicle axle dropping into a depression in a driveway, the plate-like retaining members 115 will engage the connecting webs 111 and during this action, owing to the cross section of these connecting webs being small in relation to the cross section subject to compressive force, substantially only the connecting webs and the directly adjacent portions of the flanges 102 are elastically deformed. In the case of pressure load first the flanges 102 will engage to an increasing extent the base plate 113 and then, in addition, the ribs 104 will bear against the strip of semicircular section 107. When further pressure load is being applied, the plate-like retaining members 115 which meanwhile have lifted off the connecting webs 111 will engage the central portion 103 thereby to cause same to participate directly in the cushioning action. This mode of operation ensures in the case of pressure load a markedly progressive spring characteristic, which is the main purpose of the elastic body. The spring characteristic can be varied with very simple means, namely, by varying the thickness of the plate-like retaining members 115 which do not completely fill the windows 112. A complete filling of the windows 112 with the plate-like retaining members 115 is indeed possible, however, this would lead to shorter total travel strokes and to a reduction in progressivity, which may be expedient for quite special cases only. For exchanging the elastic body it is e.g. only necessary to loosen the screws 116 of the plate-like retaining members to laterally withdraw the retaining members 115. Thereafter the solid integral elastic body which does not consist of a rubber-metal compound can be easily removed.

Figure 1B:
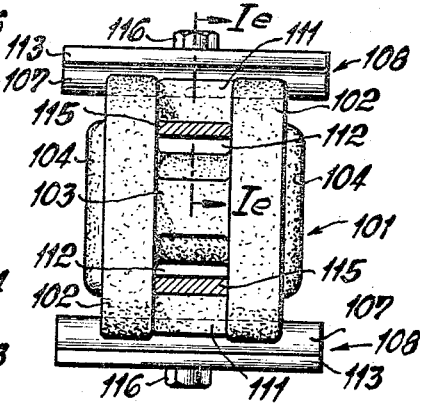
FIG. 1b is a schematic side elevational view of the elastic body of FIG. 1a turned through an angle of 90 degrees relative to FIG. 1a with the bearing members shown in section.
Figure 1C:
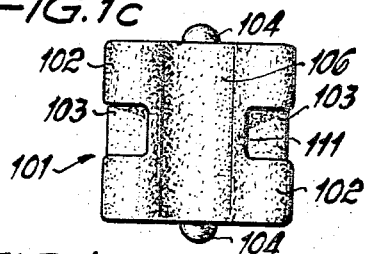
FIG. 1c is a schematic top plan view of the elastic body of FIG. 1a without bearing members.
Figure 1D:
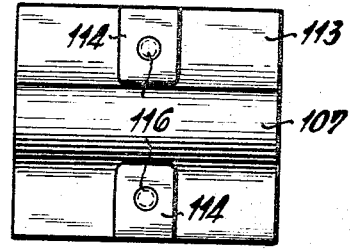
FIG. 1d is a schematic top plan view of the supporting surface of one bearing member without elastic body.
Figure 1E:
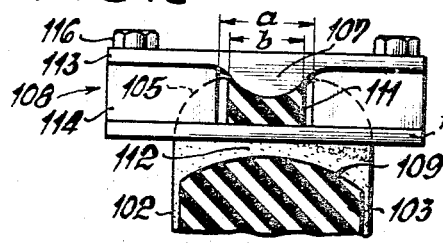
FIG. 1e is a schematic section through the elastic body taken on the line A—A of FIG. 1b with the bearing members not shown in section.
Figure 2A:
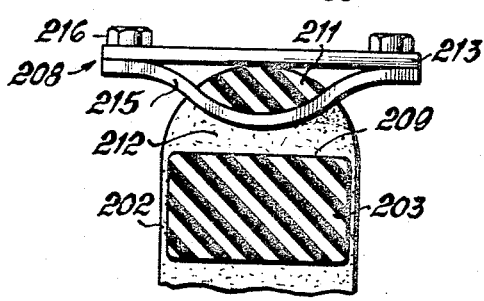
FIG. 2a is a representation similar to FIG. 1e, showing a second embodiment of the elastic body.
Figure 2B:
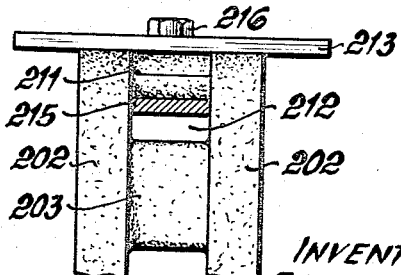

In the embodiment shown in FIGS. 2a and 2b, flanges 202 have at their ends a substantially semicircular configuration. In this case the recess 106 is dispensed with. Surfaces 209 of a central portion 203 extend e.g. in a straight line. Bearing members 208 for the elastic body each comprise a base plate 213 consisting simply of a flat sheet-metal piece. Plate-like retaining members 215 are in this case e.g. of curved configuration and directly secured to the base plates 213 e.g. by screws 216. Connecting webs 211 have in this case e.g. a substantially ellipse-shaped cross section. Also here as in the embodiment of FIGS. 1a to 1e, a gradual start and a progressive rise in force are obtained by the co-operation of the curved plate-like retaining member 215 and the straight central portion 203. Changes of the characteristic are also in this case obtainable by different thickness and different shape of the plate-like retaining members 215. The embodiment according to FIGS. 2a and 2b is distinguished both with respect to the shape of the elastic body and with respect to the shape of the bearing members by a particular simplicity in manufacture. Also in this case ribs similar to the ribs 104 of the embodiment of FIGS. 1a to 1e may be provided.

Figure 3:
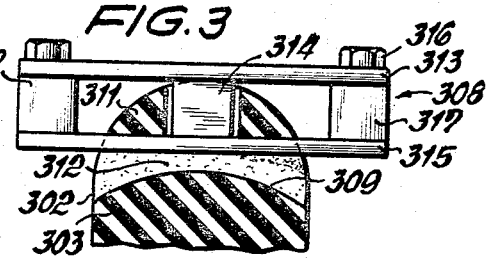
FIG. 3 is a representation similar to FIG. 1e, showing a third embodiment of the elastic body.

The embodiment shown in FIG. 3 largely corresponds to that shown in FIGS. 1a to 1e. Each base plate has in this case only one single guide piece 314 which is centrally arranged. Flanges 302 are interconnected on their left and right sides by one connecting web 311 each. For securing plate-like retaining members 315 e.g. by screws 316 special connecting pieces 317 are arranged on the base plates.

Figure 4A:
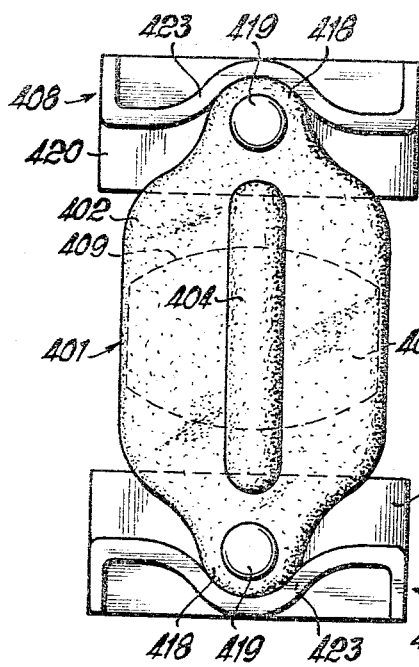
FIG. 4a is a schematic side elevational view of an elastic body supported by bolts.
Figure 4B:
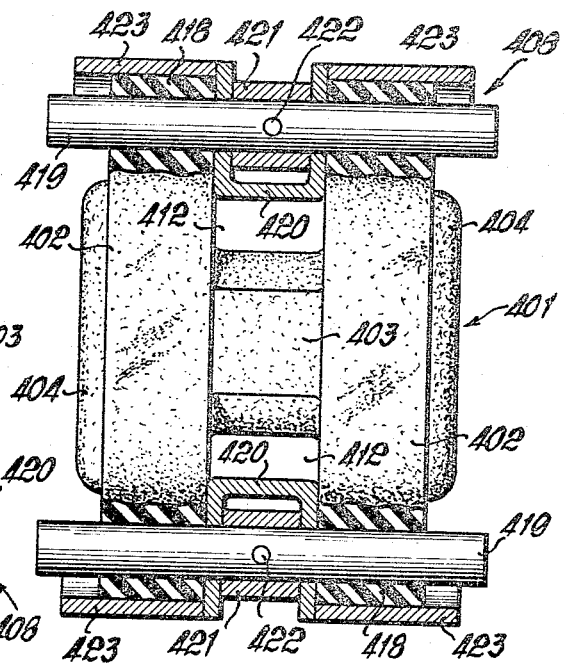

In the embodiment according to FIGS. 4a and 4b flanges 402 carry eye-like extensions 418 through which e.g. bolts 419 are passed which may be secured in a U-shaped middle piece 420 of bearing members 408 for the elastic body e.g. by a sleeve 421 and a heavy-strain pin 422. To the middle piece 420 of the bearing members 408 outer pieces 423 are secured which constitute further part of the bearing members and serve as abutments for the flanges 402 whereas the middle piece 420 co-operates with a central portion 403 of the elastic body only after a certain travel stroke of the elastic body when subjecting the elastic body to pressure. If ribs 404 are present, as shown in the exemplified embodiment, these bear against the bolts 419 after a certain compression of the elastic body. In the case of tensile load substantially only the eye-like extensions 418 will be deformed. The mode of operation is analogously the same as described with reference to FIGS. 1a to 1e.

Figure 5:
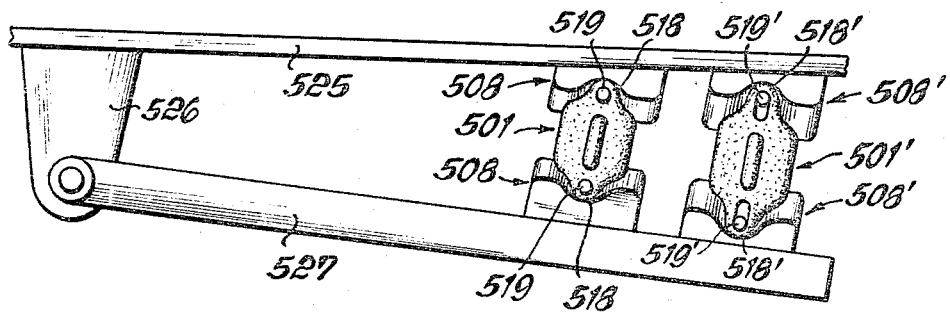
FIG. 5 is a schematic side elevational view of a swing arm cushioned by a spring assembly of e.g. two elastic bodies prestressed in opposite directions.

In FIG. 5 e.g. a swing arm 527 is pivotally mounted by means of a bearing block 526 on a vehicle frame 525. Between the frame 525 and the swing arm 527 e.g. two elastic bodies according to FIGS. 4a and 4b are arranged. In this arrangement the distances between bolts 519 and 519' are so chosen that the elastic body 501 is prestressed by pressure and the elastic body 501' is prestressed by tension when no load is acting on the swing arm 527. This results in a particularly marked progressivity of the spring characteristic when pressure load is acting on the swing arm. For the elastic body 501' any form shown in FIGS. 1 to 4 is imaginable. The same applies to the elastic body 501. Furthermore, the elastic body 501 may also be replaced by a compression spring of any type, e.g. by a coil or cup spring.

Figure 6A:
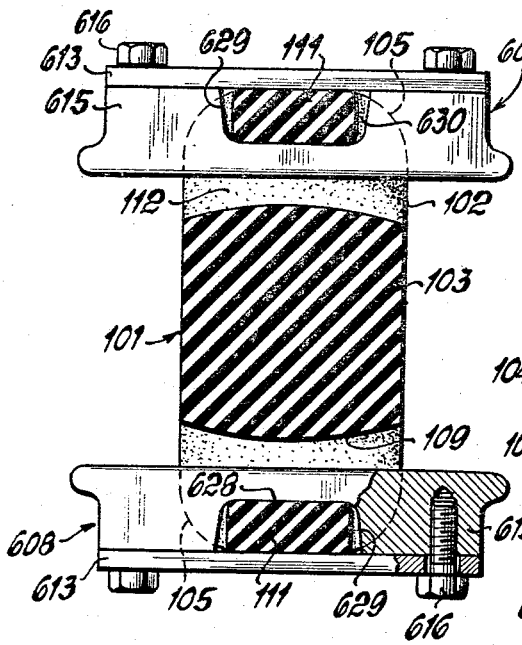
FIG. 6a is a representation similar to FIG. 1e, showing an elastic body of similar construction but with bearing members of different design, partly in section.
Figure 6B:
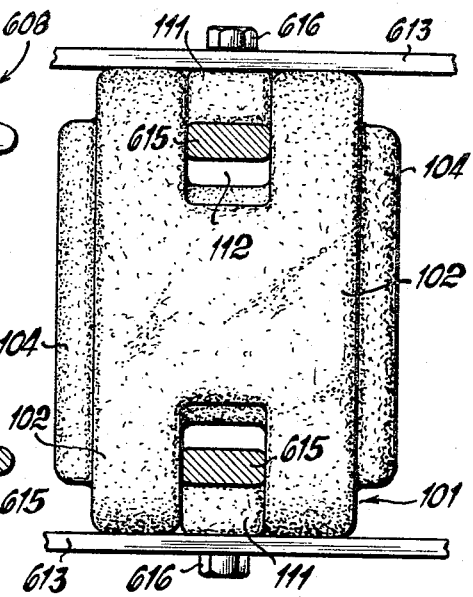
FIG. 6b is a schematic side elevational view of the elastic body of FIG. 6a turned through an angle of 90 degrees relative to FIG. 6a with the bearing members shown in section.
Figure 6C:
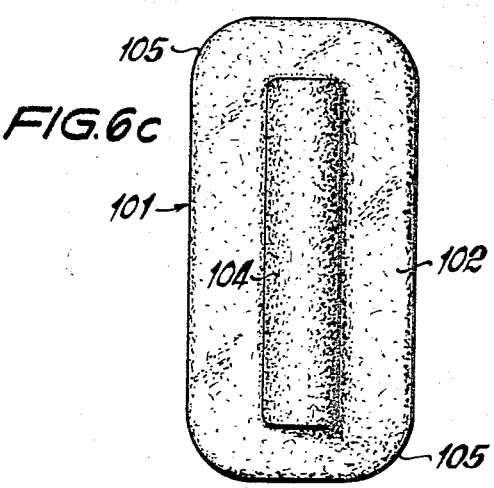
FIG. 6c is a schematic elevational view of the right-hand side of the elastic body of FIG. 6b without bearing members.
Figure 6D:
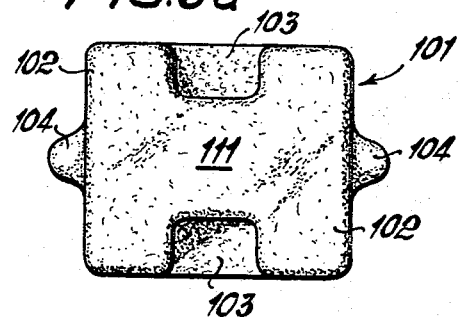
FIG. 6d is a schematic top plan view of the elastic body of FIG. 6a without bearing members.
Figure 6E:
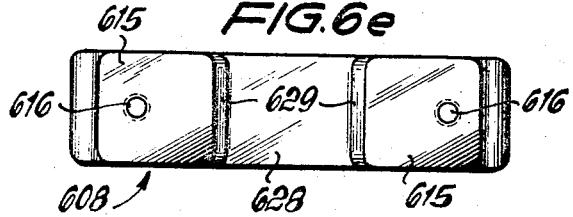
FIG. 6e is a schematic top plan view of the inner part of one bearing member.

In the embodiment shown in FIGS. 6a to 6e, the H-shaped elastic body 101 substantially has the same form as in FIGS. 1a, 1b and 1c with the exception that the edges 105 of the flanges 102 do not merge into trough-like recesses 106 but are so designed as to extend rectilinearly (see FIG. 6c). For the positive connection of the elastic body 101 bearing members 608 of special construction are provided.

Each bearing member 608 for the elastic body comprises a flat base plate 613 and a bridge piece 615 which is provided in its central portion with a recess 628. The recess 628 has a slightly larger width than the connecting web 111 of the elastic body 101 which has the form of an elongated rectangle in cross section and on which the bridge piece is placed from the interior, i.e. from the window 112. The recess 628 is defined by obliquely diverging surfaces 629 and so dimensioned in depth that the surface of the bridge piece 615 on the side having the recess 628 closely engages the connecting web 111 when the bridge piece 615 is mounted on the connecting web in the indicated manner.

The base plate 613 is detachably fixed to the bridge piece 615 by means of screws 616 and detachably or undetachably connected to one of the parts (not shown) to be cushioned.

Particularly favourable properties of the elastic bodies will be obtained when the cross section of the connecting webs which is stressed by tension is only so small that say with one fourth to one twelfth of the compressive force applied as tensile force substantially the same travel strokes will be attained. The spring temper in the case of tension is therefore about four to twelve times as small as the spring temper in the case of pressure.

As material for the elastic bodies preferably rubber is used. However, use may also be made of synthetic plastics materials having elastic properties similar to those of rubber.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description and all changes which come within the meaning and range of equivalency of the claims are therefore intended to be embraced therein.

We claim:

1. A solid integral elastic body of rubber-elastic material for stressing by compressive forces and tensile forces smaller in relation to the compressive forces, particularly for cushioning wheel axles of vehicles, comprising; a pair of flanges having the full height of the elastic body, a central portion connecting said pair of flanges and defining, together with said pair of flanges, an H-shaped basic form of the elastic body, sections on said flanges in the vicinity of marginal edges thereof defining the height of the elastic body, said sections having a reduced resistance to deformation as compared with the main sections of the elastic body, and bearing members for the elastic body positively connected with the elastic body and supporting in the direction of the compressive forces all surface sections of the boundary surfaces of the elastic body facing the bearing members, said sections of reduced resistance to deformation being arranged between two parts of said bearing members connected with them.

2. An elastic body as claimed in claim 1, wherein the sections of reduced resistance to deformation are constructed as webs connecting the flanges and having no direct connection with the central portion.

3. An elastic body as claimed in claim 1, wherein the sections of reduced resistance to deformation are constructed as eye-like extensions on the ends of the pair of flanges and bolts which are mounted in parts of the bearing members exclusively serving to subject the elastic body to pressure are passed through said eye-like extensions.

4. An elastic body as claimed in claim 1, wherein the parts of the bearing members by means of which the sections of reduced resistance to deformation are loadable in the direction of the tensile forces are arranged, when the elastic body is unloaded, at such a free distance from pressure surfaces of the central portion that when subjecting the elastic body to pressure, they are capable of coming into engagement with the pressure surfaces facing them, after a predetermined travel stroke of the elastic body.

5. An elastic body as claimed in claim 1, wherein reinforcing ribs which are provided on the outer side of the flanges of the elastic body and extend in the longitudinal direction of the flanges terminate outside the region of the sections of reduced resistance to deformation.

6. Spring assembly having at least one elastic body as claimed in claim 1, wherein at least one of the elastic bodies while subjecting its sections of reduced resistance to deformation to tension is prestressed by tension contrary to prestressing by pressure of one or more of other elastic bodies, when the spring assembly is in unloaded condition.

No references cited.

ARTHUR L. LA POINT, *Primary Examiner.*

R. M. WOHLFARTH, *Assistant Examiner.*